United States Patent
Kim et al.

(10) Patent No.: US 11,560,105 B2
(45) Date of Patent: Jan. 24, 2023

(54) UNDERCOVER FOR VEHICLES HAVING HIGH ELASTICITY AND RIGIDITY AND METHOD FOR MANUFACTURING THE SAME

(71) Applicants: Hyundai Motor Company, Seoul (KR); Kia Motors Corporation, Seoul (KR); HADO FNC CO., LTD., Gyeonggi-do (KR)

(72) Inventors: Seong Je Kim, Jeollanam-do (KR); Keun Young Kim, Gyeonggi-do (KR); Tae Yoon Kim, Daejeon (KR); Jung Wook Lee, Gyeonggi-do (KR); Young Su Kim, Gyeonggi-do (KR); Jong Eun Ha, Seoul (KR)

(73) Assignees: Hyundai Motor Company, Seoul (KR); Kia Motors Corporation, Seoul (KR); Hado FNC Co., Ltd., Gyeonggi-do (KR)

( * ) Notice: Subject to any disclaimer, the term of this patent is extended or adjusted under 35 U.S.C. 154(b) by 451 days.

(21) Appl. No.: 16/700,582

(22) Filed: Dec. 2, 2019

(65) Prior Publication Data
US 2020/0331412 A1    Oct. 22, 2020

(30) Foreign Application Priority Data
Apr. 22, 2019 (KR) .................. 10-2019-0046575

(51) Int. Cl.
*B60R 13/08* (2006.01)
*D01F 6/62* (2006.01)
*B32B 5/02* (2006.01)
(Continued)

(52) U.S. Cl.
CPC .......... *B60R 13/0861* (2013.01); *B32B 5/022* (2013.01); *B32B 27/12* (2013.01);
(Continued)

(58) Field of Classification Search
CPC ............ B60R 13/0861; B60R 13/0838; B60R 13/0884; B32B 5/022; B32B 27/12;
(Continued)

(56) References Cited

U.S. PATENT DOCUMENTS

| | | | | |
|---|---|---|---|---|
| 4,032,607 A | * | 6/1977 | Schulz | D04H 1/56 423/447.4 |
| 2013/0277146 A1 | * | 10/2013 | Lee | B32B 7/02 181/290 |
| 2015/0314738 A1 | * | 11/2015 | Kim | D04H 1/4326 156/62.8 |

FOREIGN PATENT DOCUMENTS

| KR | 20140042982 A | | 4/2014 |
|---|---|---|---|
| KR | 20170004639 A | * | 1/2017 |
| KR | 20180009918 A | * | 1/2018 |

OTHER PUBLICATIONS

KR20180009918A—machine translation (Year: 2018).*
KR20170004639A—machine translation (Year: 2017).*

\* cited by examiner

*Primary Examiner* — Francisco W Tschen
*Assistant Examiner* — Abhishek A Patwardhan
(74) *Attorney, Agent, or Firm* — Fox Rothschild LLP

(57) ABSTRACT

Disclosed are an undercover for vehicles with high elasticity and rigidity and a method of manufacturing the same. The undercover for vehicles with high elasticity and rigidity may include a needle-punched nonwoven fabric having a multi-layer structure of felt layers including a first PET fiber and a low-melting-point PET fiber, and each of the felt layers may have improved tensile strength and have optimized fiber alignment, to thereby improve the binding between fibers, mechanical rigidity and elasticity, as well as to reduce the weight of components, improve durability and secure harmlessness and inline workability.

5 Claims, 1 Drawing Sheet

(51) Int. Cl.
- *B32B 27/12* (2006.01)
- *B32B 27/32* (2006.01)
- *D04H 3/10* (2012.01)
- *B32B 37/10* (2006.01)
- *B32B 37/06* (2006.01)
- *B32B 37/02* (2006.01)
- *B32B 5/26* (2006.01)
- *B32B 38/00* (2006.01)
- *B32B 38/04* (2006.01)

(52) U.S. Cl.
CPC .............. *B32B 27/32* (2013.01); *B32B 37/02* (2013.01); *B32B 37/06* (2013.01); *B32B 37/10* (2013.01); *D01F 6/62* (2013.01); *D04H 3/102* (2013.01); *B32B 5/26* (2013.01); *B32B 38/04* (2013.01); *B32B 2038/0072* (2013.01); *B32B 2262/0284* (2013.01); *B32B 2305/20* (2013.01); *B32B 2367/00* (2013.01); *B32B 2605/08* (2013.01); *B60R 13/0838* (2013.01)

(58) Field of Classification Search
CPC ......... B32B 27/32; B32B 37/02; B32B 37/06; B32B 37/10; B32B 5/26; B32B 38/04; B32B 2038/0072; B32B 2262/0284; B32B 2305/20; B32B 2367/00; B32B 2605/08; B32B 2250/03; B32B 2250/20; B32B 2307/306; B32B 5/06; B32B 5/08; B32B 2250/04; B32B 2307/51; B32B 2307/54; B32B 7/02; B32B 2250/02; B32B 2250/05; B32B 2262/14; B32B 2307/718; B32B 2571/00; B32B 2605/00; B32B 5/028; B32B 38/00; B32B 2038/008; B32B 2262/0276; B32B 7/022; D01F 6/62; D04H 3/102; B62D 29/041

See application file for complete search history.

UNDERCOVER FOR VEHICLES HAVING HIGH ELASTICITY AND RIGIDITY AND METHOD FOR MANUFACTURING THE SAME

CROSS-REFERENCE TO RELATED APPLICATION

This application claims, under 35 U.S.C. § 119(a), the benefit of priority to Korean Patent Application No. 10-2019-0046575 filed on Apr. 22, 2019, the entire contents of which are incorporated herein by reference.

TECHNICAL FIELD

The present invention relates to an undercover for vehicles with high rigidity that includes a needle-punched nonwoven fabric having a multi-layer structure of felt layers containing a PET fiber and a low-melting-point PET fiber, each having improved tensile strength, and having optimized fiber alignment, and a method of manufacturing the same.

BACKGROUND

In the related art, an undercover is mounted on the bottom of a vehicle, and functions to protect components including an engine and a transmission installed in the underside of the vehicle. The undercover also functions to prevent foreign matter from entering the vehicle through the bottom of the vehicle while driving. In addition, the undercover plays an important role in absorbing and blocking noise generated from the vehicle, particularly, an engine and a transmission, and thereby preventing the noise from being transmitted to the outside of the vehicle.

Conventional materials for undercovers include materials such as polypropylene and glass-fiber-reinforced polypropylene composites. However, these materials have drawbacks of low fuel efficiency and poor NVH (noise, vibration, harshness) performance because of the excessively high weight thereof. In particular, the glass-fiber-reinforced polypropylene composites have associated problems of glass fiber dust and the disadvantage of low durability against external impacts.

In order to solve these problems in the technical field, polyethylene terephthalate materials has been applied to manufacturing the undercovers. However, such polyethylene terephthalate materials have less flexural rigidity than that of the conventional materials, and thus need to be made more rigid in order to improve inline workability.

The above information disclosed in this Background section is provided only for enhancement of understanding of the background of the invention and therefore it may contain information that does not form the prior art that is already known in this country to a person of ordinary skill in the art.

SUMMARY

In preferred aspects, provided are an undercover for vehicles having high elasticity and high rigidity due to the improved binding force between fibers and a method for manufacturing an undercover for vehicles which may reduce the weight of components, improves durability, and secures harmlessness (safety) and inline workability.

The objects of the present invention are not limited to those described above. The objects of the present invention will be clearly understood from the following description and can be implemented by the means defined in the claims and combinations thereof.

In one aspect, provided is an undercover for vehicles having high elasticity and rigidity. The undercover may include a needle-punched nonwoven fabric formed by needle-punching a first nonwoven fabric layer including one or more first felt layers with a second nonwoven fabric layer formed on the first nonwoven fabric layer and including one or more second felt layers. Preferably, each of the first felt layer and the second felt layer may include a fiber web including an amount of about 1 to 40% by weight of a polyethylene terephthalate fiber and an amount of about 60 to 99% by weight of a low-melting-point polyethylene terephthalate fiber based on the total weight of the fiber web.

The first felt layer and the second felt layer may be the same or different. The first felt layer and the second felt layer may be the same, for example, having the identical components and contents thereof. The first felt layer and the second felt layer may be different, for example, having at least one or more different components or having different contents of at least one or more components.

If the first and the second felt layers are different, suitably at least about 1, 2, 3, 4, 5, 10, 15 or 20 percent by weight of the first felt layer composition is different from that of the second layer composition.

Preferably, each of first nonwoven fabric layer and the second nonwoven fabric layer may include the first felt layer and the second felt layer which are laminated in a multilayer structure of two or three layers thereof. For example, each of first nonwoven fabric layer and the second nonwoven fabric layer may include the first felt layer and the second felt layer which are laminated in a multilayer structure of two layers of the first felt layer and the second felt layer. Moreover, each of first nonwoven fabric layer and the second nonwoven fabric layer may include the first felt layer and the second felt layer which are laminated in a multilayer structure of three layers of the first felt layer and the second felt layer.

Each of the first nonwoven fabric layer and the second nonwoven fabric layer may include fiber webs including the fibers of the first felt layer and the second felt layer randomly mixed in horizontal and vertical alignments.

The first nonwoven fabric layer and the second nonwoven fabric layer may suitably have a weight per unit area of about 300 to 750 g/m².

The first nonwoven fabric layer and the second nonwoven fabric layer may be repeatedly laminated in a multilayer structure of three to five layers thereof. For example, the first nonwoven fabric layer and the second nonwoven fabric layer may be repeatedly laminated in a multilayer structure of three layers, four layers, or five layers.

The polyethylene terephthalate fiber ("first polyethylene terephthalate fiber") may suitably have a melting point of about 240 to 270° C., a fiber length of about 48 to 76 mm and a tensile strength of about 3 to 4 g/De.

The low-melting-point polyethylene terephthalate fiber may suitably have a melting point of about 105 to 180° C., a fiber length of about 48 to 76 mm and a tensile strength of about 3 to 4 g/De. In any aspect, the low-melting point polyethylene terephthalate fiber will have a melting point that is at the temperature about 5, 10, 20, or 30 degrees less than the melting point of the first polyethylene terephthalate fiber.

The needle-punched nonwoven fabric may suitably have a weight per unit area of about 600 to 1,500 g/m².

The number of times of needle punching of the needle-punched nonwoven fabric may suitably be about 20 to 80 punching/cm$^2$.

In another aspect, provided is a method of manufacturing an undercover for vehicles with high elasticity and high rigidity. The method may include steps of: i) providing a first polyethylene terephthalate fiber having a melting point of about 240 to 270° C. and a low-melting-point polyethylene terephthalate fiber having a melting point of about 105 to 180° C., ii) forming a fiber web by carding an amount of about 1 to 40% by weight of the first polyethylene terephthalate fiber and an amount of about 60 to 99% by weight of the low-melting-point polyethylene terephthalate fiber based on the total weight of the fiber web, iii) forming each of a first felt layer and a second felt layer by binding and hot-pressing the fiber web, iv) forming each of a first nonwoven fabric layer and a second nonwoven fabric layer by laminating the first felt layer and the second felt layer in two to three layers, and v) producing a needle-punched nonwoven fabric by laminating the second nonwoven fabric layer on the first nonwoven fabric layer, followed by needle punching.

The first polyethylene terephthalate fiber may suitably have a fiber length of about 48 to 76 mm and a tensile strength of about 3 to 4 g/De.

The low-melting-point polyethylene terephthalate fiber may suitably have a fiber length of about 48 to 76 mm and a tensile strength of about 3 to 4 g/De.

In the formation of each of the first nonwoven fabric layer and the second nonwoven fabric layer, each of the first nonwoven fabric layer and the second nonwoven fabric layer may be formed by repeatedly laminating the fiber web in a multilayer structure of three to five layers.

In the producing the needle-punched nonwoven fabric, the needle-punched nonwoven fabric may suitably have a weight per unit area of about 600 to 1,500 g/m$^2$.

The number of times of the needle punching in the producing the needle-punched nonwoven fabric may suitably be about 20 to 80 punching/cm$^2$.

Also provided is a vehicle including the undercover as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Figure 1:
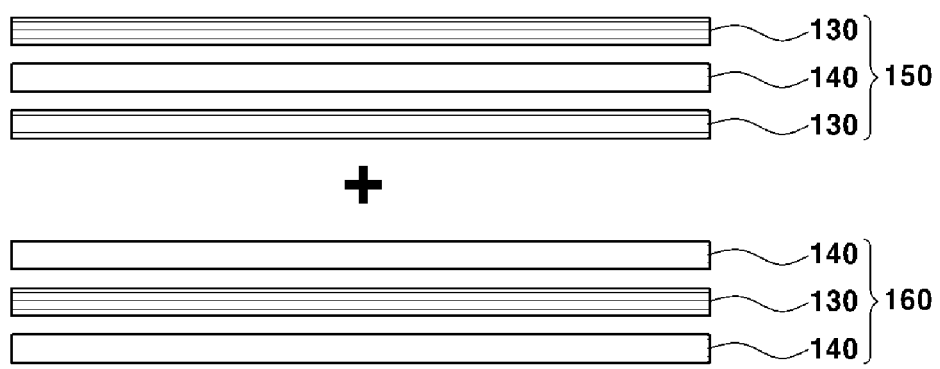
FIG. 1 is a cross-sectional view showing an exemplary needle-punched nonwoven fabric of an exemplary undercover for vehicles according to an exemplary embodiment of the present invention.

The objects described above, and other objects, features and advantages of the present invention will be clearly understood from the following preferred embodiments with reference to the attached drawings. However, the present invention is not limited to the embodiments and may be embodied in different forms. The embodiments are suggested only to offer a thorough and complete understanding of the disclosed context and to sufficiently inform those skilled in the art of the technical concept of the present invention.

Like numbers refer to like elements throughout the description of the figures. In the drawings, the sizes of structures are exaggerated for clarity. It will be understood that, although the terms "first", "second", etc. may be used herein to describe various elements, these elements should not be construed to be limited by these terms, which are used only to distinguish one element from another. For example, within the scope defined by the present invention, a "first" element may be referred to as a "second" element, and similarly, the "second" element may be referred to as the "first" element. Singular forms are intended to include plural forms as well, unless the context clearly indicates otherwise.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In addition, when numerical ranges are disclosed in the description, these ranges are continuous and include all numbers from the minimum to the maximum including the maximum within each range unless otherwise defined. Furthermore, when the range refers to an integer, it includes all integers from the minimum to the maximum including the maximum within the range, unless otherwise defined.

Throughout this specification, hereinafter, a first polyethylene terephthalate (110 in FIG. 2) is referred to as "regular PET", "first PET", or "PET", and a low-melting point polyethylene terephthalate (120 in FIG. 2) is referred to as "low-melting-point PET".

In particular, the term "regular PET", "first PET", or "PET" as used herein refers to a unmodified polyethylene terephthalate which typically has a melting point in a range of about 230 to 280° C., or particularly of about 240 to 270° C., or for example, or of about 250 to 260° C. The term "low-melting point polyethylene terephthalate" or "low-melting point PET" as used herein refers to a polyethylene terephthalate which is modified, for example, by incorporating different monomers such as cyclohexane dimethanolin the place of ethylene glycol monomer of the polymer chain, so as to interfere crystallization of the PET and decrease its melting temperature (melting point or "m.p."). Preferred low-melting point PET may have a melting point in a range of about 90 to 200° C., of about 100 to 190° C., or particularly of about 105 to 180° C.

Hereinafter, various exemplary embodiments of the present invention will be described in more detail.

The undercover material for a vehicle according to exemplary embodiments of the present invention may include a single PET material, rather than using reinforcing fibers having high rigidity such as carbon fibers and glass fibers, which have been conventionally used for undercovers, but improves rigidity and elasticity by adjusting the strength, content and fiber alignment of fibers to fall within optimum ranges.

The undercover for vehicles may secure mechanical strength by using a first felt layer and a second felt layer including a regular PET fiber and a low-melting-point PET fiber, each having improved tensile strength. Also, the strain (deformation) due to the load maybe minimized by improving the internal binding structure of the felt layers, so the weight of components can be reduced and the durability can be improved.

In addition, a first nonwoven fabric layer and a second nonwoven fabric layer, each including the first felt layer and the second felt layer, may be needle-punched, and the number of times of the needle-punching may be minimized, thereby optimizing the fiber alignment of regular PET and low-melting-point PET fibers and improving binding strength between fibers and elasticity. In addition, since the undercover for vehicles may contain only PET fibers and does not contain any glass fibers, it may secure harmlessness and inline workability and is advantageous in that PET may be easily recycled.

The present invention provides an undercover for vehicles including a needle-punched nonwoven fabric formed by needle-punching a first nonwoven fabric layer including a first felt layer and a second nonwoven fabric layer including a second felt layer formed on the first nonwoven fabric layer. Each of the first felt layer and the second felt layer may suitably include a fiber web containing an amount of about 1 to 40% by weight of a regular PET fiber and an amount of about 60 to 99% by weight of a low-melting-point PET fiber, based on the total weight of the fiber web.

FIG. 1 is a cross-sectional view of an exemplary needle-punched nonwoven fabric of an exemplary undercover for vehicles according to an exemplary embodiment of the present invention. As shown in FIG. 1, the needle-punched nonwoven fabric includes a first nonwoven fabric layer 150 and a second nonwoven fabric layer 160 formed on the first nonwoven fabric layer 150. Each of the first nonwoven fabric layer 150 and the second nonwoven fabric layer 160 may include the first felt layer 130 and the second felt layer 140, which are laminated in a multilayer structure of two or three layers. When the first felt layer and the second felt layer are formed into a multi-layer structure having greater than three layers, the horizontal alignment of the fibers in the felt layer may be deteriorated and thus the strength may be reduced.

The first nonwoven fabric layer and the second nonwoven fabric layer may be fiber webs in which the fibers of the first felt layer and the second felt layer are randomly mixed in horizontal and vertical alignments. Each of the first nonwoven fabric layer and the second nonwoven fabric layer may include fiber webs in which regular PET fibers (e.g., 110 in FIG. 2) and low-melting-point PET fibers (e.g., 120 in FIG. 2) in the first felt layer and the second felt layer are horizontally aligned by carding, and the horizontal and vertical alignments may be randomly mixed by needle punching.

Figure 2:
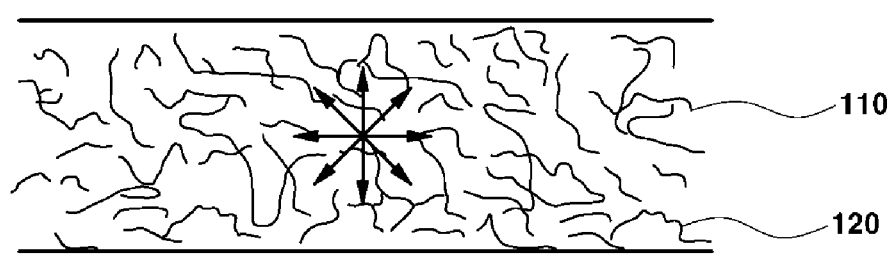
FIG. 2 shows a structure in which an exemplary fiber web of the needle-punched nonwoven fabric according to the present invention are randomly aligned in horizontal and vertical directions.

That is, the needle-punched nonwoven fabric may minimize the physical intermingling of fibers caused by needle punching when the horizontally aligned first and second nonwoven fabric layers may be combined by needle punching. FIG. 2 is a cross-sectional view showing an exemplary structure in which exemplary fibers of an exemplary needle-punched nonwoven fabric are randomly aligned both horizontally and vertically. As shown in FIG. 2, the needle-punched nonwoven fabric has advantages of lower material deformation due to a load and less direction-dependent strength difference when the fibers are aligned in horizontal and vertical directions, as shown in FIG. 2.

The first nonwoven fabric layer and the second nonwoven fabric layer may each have a weight per unit area of about 300 to 750 $g/m^2$. When the weight per unit area of the first nonwoven fabric layer and the second nonwoven fabric layer is less than about 300 $g/m^2$, productivity may be deteriorated and cost competitiveness may thus be decreased. On the other hand, when the weight per unit area of the first nonwoven fabric layer and the second nonwoven fabric layer is greater than about 750 $g/m^2$, productivity may be improved, but physical properties may be less than desired. Preferably, the weight per unit area may be about 360 to 650 $g/m^2$.

The first felt layer and the second felt layer include a fiber web including an amount of about 1 to 40 wt % of a regular PET fiber and an amount of about 60 to 99% by weight of a low-melting-point PET fiber based on the total weight of the fiber web.

The first felt layer and the second felt layer may be formed through repeated lamination to form a multilayer structure of three to five layers. The fiber web having a weight per unit area of about 40 to 50 $g/m^2$ may be produced by mixing the regular PET fiber with low-melting-point PET fiber, followed by carding.

In addition, as the fiber web is laminated in a multilayer structure of three to five layers, the fibers of the regular PET fiber and the low-melting-point PET fiber may be horizontally aligned to produce a lightweight nonwoven fabric. In the present invention, a fiber web having a weight per unit area of about 40 to 50 $g/m^2$ is formed through carding and then multi-cross lapping, and a first felt layer and a second felt layer can be formed in a multilayer structure by repeatedly laminating the formed fiber web.

The regular PET fiber may have excellent heat resistance and may impart morphological stability to the felt. The regular PET fiber may have a melting point of about 240 to 270° C., a fiber length of about 48 to 76 mm and a tensile strength of about 3 to 4 g/De.

The low-melting-point PET fiber may improve the rigidity of the felt because of the excellent low-temperature adhesive properties thereof. Particularly, the low-melting-point PET fiber may contain an amount of about 20 to 50% by weight of a sheath layer containing a PET resin (1) modified so as to have a low melting point and an improved adhesive property and an amount of about 50 to 80% by weight of a core layer containing a (regular) PET resin (2). The PET resin modified so as to have a low melting point and improved adhesive property (1) may have a melting point of about 105 to 180° C., and the regular PET resin may have a melting point of about 240 to 270° C. When the content of the low-melting-point PET resin is less than about 20% by weight, adhesion non-uniformity may occur, and when the content of the low-melting-point PET resin is greater than about 50% by weight, excessive heat distortion and strength deterioration may occur.

When the content of the low-melting-point PET fiber is less than about 60% by weight, the strength of the felt may be deteriorated. On the other hand, when the content of the low-melting-point PET fiber is greater than about 99% by weight, the rigidity of the felt may be improved, but when it exceeds a certain level, the material may be converted to a brittle material that is easily broken and the strength may be deteriorated. The low-melting-point PET fiber may have a melting point of about 105 to 180° C., a fiber length of about 48 to 76 mm and a tensile strength of about 3 to 4 g/De. When the melting point of the low-melting-point PET fiber is less than about 105° C., heat-resistant durability may be deteriorated. On the other hand, when the melting point is greater than about 180° C., moldability may be deteriorated.

Particularly, when the tensile strength of the regular PET fiber and the low-melting-point PET fiber is less than about 3 g/De, the strength of the fiber may be weak and the flexural rigidity and flexural modulus may be remarkably reduced. On the other hand, when the tensile strength of the regular PET fiber and the low-melting-point PET fiber is greater than about 4 g/De, physical properties may be deteriorated due to poor (defective) mixing of raw materials. Preferably, the tensile strength may be about 3.2 to 3.7 g/De.

The needle-punched nonwoven fabric may have a weight per unit area of about 600 to 1,500 g/m$^2$. When the weight per unit area of the needle-punched nonwoven fabric is less than about 600 g/m$^2$, the strength may be insufficient for application to a wheel guard or an undercover. On the other hand, when the weight per unit area of the needle-punched nonwoven fabric is greater than about 1,500 g/cm$^2$, cost competitiveness may be insufficient for application to a wheel guard or undercover, and weight reduction of vehicles may be inhibited. Preferably, the needle-punched nonwoven fabric may have a weight per unit area of about 1,100 to 1,300 g/m$^2$.

The number of times of the needle punching of the needle-punched nonwoven fabric may be about 20 to 80 punching/cm$^2$. When the number of times the needle punching is performed less than about 20 punching/cm$^2$, it may be difficult to produce the needle-punched nonwoven fabric properly due to insufficient binding force of the carded web. On the other hand, when the number of times of needle punching is greater than about 80 punching/cm$^2$, the alignment of the fibers is improved in a vertical direction, and the amount of strain applied to the material due to the load may increase. The needle-punched nonwoven fabric may minimize the number of times needle punching is performed on the first nonwoven fabric layer and the second nonwoven fabric layer compared to a conventional method, thereby reducing the material deformation (strain) due to the load.

In other aspect of the present invention, provided is a method of manufacturing an undercover for vehicles including: providing (e.g., preparing) a regular PET fiber having a melting point of about 240 to 270° C. and a low-melting-point PET fiber having a melting point of about 105 to 180° C.; forming a fiber web carding an amount of about 1 to 40% by weight of the regular PET fiber and an amount of about 60 to 99% by weight of the low-melting-point PET fiber based on the total weigh of the fiber web; forming each of a first felt layer and a second felt layer by binding and hot-pressing the fiber web; form each of a first nonwoven fabric layer and a second nonwoven fabric layer by laminating the first felt layer and the second felt layer in two to three layers; and producing a needle-punched nonwoven fabric by laminating the second nonwoven fabric layer on the first nonwoven fabric layer, followed by needle punching.

In the preparation of the regular PET fiber and the low-melting-point PET fiber, the regular PET fiber may be produced through spinning, stretching and crimping processes so that the regular PET fiber may have a fiber length of about 48 to 76 mm and a tensile strength of about 3 to 4 g/De. In the same manner as described above, the low-melting-point PET fiber may be produced such that the low-melting-point PET fiber has a fiber length of about 48 to 72 mm and a tensile strength of about 3 to 4 g/De.

In the formation of the first felt layer and the second felt layer, the fiber web may be laminated in a multilayer structure of three to five layers to form the first nonwoven fabric layer and the second nonwoven fabric layer.

In the production of the needle-punched nonwoven fabric, the needle-punched nonwoven fabric may have a weight per unit area of about 720 to 1,200 g/m$^2$.

In the production of the needle-punched nonwoven fabric, needle punching may be conducted by vertically moving a needle plate equipped with thousands of needles, wherein the number of times needle punching is performed may be about 20 to 80 punching/cm$^2$.

Hereinafter, the present invention will be described in more detail with reference to examples. However, the following examples should not be construed as limiting the scope of the present invention.

EXAMPLE

Example 1

A regular PET fiber was produced such that it had a melting point of 250° C. and a fiber length of 64 mm. The low-melting-point PET fiber was produced such that it had a melting point of 180° C. and a fiber length of 52 mm. In addition, the tensile strength of the regular PET fiber and the low-melting-point PET fiber was adjusted as shown in Table 1 below.

Then, 20% by weight of the regular PET fiber was mixed with 80% by weight of the low-melting-point PET fiber, followed by carding, to form a fiber web having a weight per unit area of 200 g/m$^2$. Then, the fiber web was laminated in three layers, and was then hot-pressed at a temperature of 190° C. to form a first felt layer and a second felt layer. The first felt layer and the second felt layer were each laminated in a two-layered multilayer structure to form a first nonwoven fabric layer and a second nonwoven fabric layer having a weight per unit area of 1,200 g/m$^2$ and thereby produce an undercover for vehicles.

Examples 2 to 6 and Comparative Examples 1 to 12

Undercovers for vehicles of Example 2 and Comparative Examples 1 to 6 were manufactured in the same manner as in Example 1 except that the tensile strength of the fiber was changed as shown in Table 1 below.

Undercovers for vehicles of Example 3 and Comparative Examples 7 and 8 were manufactured in the same manner as in Example 1 except that the mixing ratio of the regular PET fiber and the low-melting-point PET fiber was changed as shown in Table 2 below.

Undercovers for vehicles of Examples 4 to 6 and Comparative Examples 9 to 12 were manufactured in the same manner as in Example 1 except that the laminate structure of the felt layers and the number of times of needle punching were changed as shown in Table 3 below.

Experimental Example 1

Evaluation of Physical Properties According to Tensile Strength of Regular PET Fiber and Low-Melting-Point PET Fiber The properties of the regular PET fiber and the low-melting-point PET fiber according to the tensile strength of the undercovers for vehicles manufactured in Examples 1 and 2 and Comparative Examples 1 to 6 were each evaluated twice. The results are shown in Table 1 below. At this time, the tensile strength was evaluated in accordance with ASTM D5034, and the flexural strength and flexural modulus were evaluated in accordance with ISO 178 A method.

TABLE 1

| Item | Regular PET fiber Tensile strength (g/De) | Low-melting-point PET fiber Tensile strength (g/De) | Needle-punched nonwoven fabric | | |
|---|---|---|---|---|---|
| | | | Tensile strength (N) | Flexural strength (N) | Flexural modulus (Mpa) |
| Ex. 1 | 3.2~3.7 | 3.2~3.7 | 2,063/2,114 | 28/25 | 1,403/1,107 |
| Ex. 2 | 3.0~3.2 | 3.0~3.2 | 2,040/1,950 | 24/22 | 1,180/1,070 |
| Comp. Ex. 1 | 2.5~2.7 | 2.5~2.7 | 1,636/1,823 | 16/13 | 715/730 |
| Comp. Ex. 2 | 2.5~2.7 | 3.0~3.2 | 1,830/1,810 | 19/18 | 875/823 |
| Comp. Ex. 3 | 3.0~3.2 | 2.5~2.7 | 1,965/1,716 | 19/17 | 980/745 |
| Comp. Ex. 4 | 4.2~4.7 | 4.2~4.7 | 2,006/1,627 | 21/17 | 987/780 |
| Comp. Ex. 5 | 4.2~4.7 | 3.0~3.2 | 1,991/1,875 | 22/21 | 1,105/1,050 |
| Comp. Ex. 6 | 3.0~3.2 | 4.2~4.7 | 2,018/1,747 | 23/22 | 1,080/1,113 |

The results shown in Table 1 show that, when, in Examples 1 and 2, the tensile strength of the regular PET fiber and the low-melting-point PET fiber fall within the range of 3 to 4 g/De, the tensile strength, flexural strength and flexural modulus of the needle-punched nonwoven fabric are excellent overall, and as the tensile strength of the fiber increases, the rigidity and elasticity of the needle-punched nonwoven fabric increase.

On the other hand, the results of Table 1 show that, in Comparative Examples 1 to 3, 5 and 6, the specific tensile strength ranges of the regular PET fiber and the low-melting-point PET fiber are all unsatisfactory, and the tensile strength, flexural strength and flexural modulus of the needle-punched nonwoven fabric are significantly deteriorated.

Also, in Comparative Example 4, when the tensile strength of the fiber exceeds 4 g/De, the tensile strength of the needle-punched nonwoven fabric is maintained at an appropriate level, but the flexural strength and flexural modulus of the needle-punched nonwoven fabric are decreased due to defective (poor) mixing of raw materials.

Experimental Example 2

Evaluation of Physical Properties According to Mixing Ratio of Regular PET Fiber and Low-Melting-Point PET Fiber The physical properties according to the mixing ratio of the regular PET fiber and the low-melting-point PET fiber of the undercovers for vehicles manufactured in Examples 1 and 3 and Comparative Examples 7 and 8 were each evaluated twice, and the results are shown in Table 2 below.

TABLE 2

| Item | Regular PET fiber (wt %) Tensile strength: 3.2~3.7g/De | Low-melting-point PET fiber (wt %) Tensile strength 3.2~3.7g/De | Needle-punched nonwoven fabric | | |
|---|---|---|---|---|---|
| | | | Tensile strength (N) | Flexural strength (N) | Flexural modulus (Mpa) |
| Ex. 1 | 40 | 60 | 2,063/2,114 | 28/25 | 1,403/1,107 |
| Ex. 3 | 20 | 80 | 2,060/2,100 | 26/24 | 1,365/1,058 |
| Comp. Ex. 7 | 60 | 40 | 1,744/1,507 | 24/20 | 1,453/1,217 |
| Comp. Ex. 8 | 80 | 20 | 1,470/1,060 | 12/9 | 730/548 |

The results of Table 2 show that, in Examples 1 and 3, the regular PET fiber and the low-melting-point PET fiber were mixed at a proper ratio, and that the tensile strength, the flexural strength and the flexural modulus were excellent overall.

On the other hand, in Comparative Examples 7 and 8, as the relative content of the low-melting-point PET fiber was decreased, the rigidity and elasticity were rapidly reduced due to insufficient adhesion between fibers.

Experimental Example 3

Evaluation of Properties According to Laminate Structure of Needle-Punched Nonwoven Fabric and Number of Times of Needle Punching The physical properties according to the laminate structure of the needle-punched nonwoven fabric and the number of times of needle punching of the undercovers for vehicles manufactured in Examples 1 and 4 to 6, and Comparative Examples 9 to 12 were evaluated twice, and the results are shown in Table 3 below.

TABLE 3

| Item | First nonwoven fabric layer Felt layer structure | Second nonwoven fabric layer Felt layer structure | Needle-punched nonwoven fabric | | | |
|---|---|---|---|---|---|---|
| | | | The number of times of needle punching (punching/cm$^2$) | Tensile strength (N) | Flexural strength (N) | Flexural modulus (Mpa) |
| Ex. 1 | 3 layers | 3 layers | 30 | 2,063/2,114 | 28/25 | 1,403/1,107 |
| Ex. 4 | 2 layers | 2 layers | 30 | 1,840/1,850 | 20/21 | 705/830 |
| Ex. 5 | 3 layers | 3 layers | 80 | 2,000/2,050 | 24/25 | 1,000/1,280 |
| Ex. 6 | 2 layers | 2 layers | 80 | 1,820/1,850 | 19/20 | 700/802 |
| Comp. Ex. 9 | 3 layers | 3 layers | 90 | 1,872/1,926 | 23/25 | 935/1,188 |
| Comp. Ex. 10 | 2 layers | 2 layers | 10 | 1,700/1,705 | 17/18 | 710/980 |
| Comp. Ex. 11 | 1 layer | 1 layer | 30 | 1,564/1,497 | 17/18 | 699/817 |

The results of Table 3 show that the tensile strength, flexural strength and flexural modulus of Examples 1 and 4 to 6 were all superior to those of the needle-punched nonwoven fabric according to the laminate structure and the number of times of needle punching operations.

On the other hand, in Comparative Example 9, the number of times of needle punching was excessively high, for example, 90 punching/cm$^2$, and the vertical alignment between the fibers was increased, so that the tensile strength and the flexural modulus were decreased compared to Examples 1 and 5.

In Comparative Example 10, the number of times of needle punching was excessively low, for example, 10 punching/cm$^2$, so that the binding between fibers was deteriorated, and tensile strength and flexural strength were reduced compared to Examples 4 and 6.

In Comparative Example 11, the needle-punched nonwoven fabric including the first felt layer and the second felt layer, each formed as a single layer, had a relatively low tensile strength, flexural strength and flexural modulus due to the low horizontal alignment ratio of the fibers. Also, these physical properties did not satisfy the properties required for undercovers.

The undercover for vehicles according to various exemplary embodiments of the present invention utilizes a first felt layer and a second felt layer, each of which includes a regular PET fiber and a low-melting-point PET fiber and has improved tensile strength, thereby securing mechanical rigidity, reducing the weight of components and improving the durability thereof.

The undercover for vehicles according to various exemplary embodiments of the present invention may include a first nonwoven fabric layer and a second nonwoven fabric layer, each of which includes a first felt layer and a second felt layer, may be needle-punched and the number of times needle punching may be performed minimized, so that the alignment of the regular PET and low-melting-point fibers may be optimized, and the binding between the fibers and elasticity maybe improved.

In addition, the undercover for vehicles according to various exemplary embodiments of the present invention may not contain glass fibers at all and may include only a PET fiber, thereby securing harmlessness and inline workability and being advantageous for recycling PET.

The effects of the present invention are not limited to those mentioned above. It should be understood that the effects of the present invention include all effects that can be inferred from the description of the present invention.

The invention has been described in detail with reference to the exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing an undercover for vehicles with high elasticity and high rigidity comprising: providing a first polyethylene terephthalate fiber having a melting point of about 240 to 270° C. and a low-melting-point polyethylene terephthalate fiber having a melting point of about 105 to 180° C.; forming a fiber web by carding an amount of about 1 to 40% by weight of the first polyethylene terephthalate fiber and an amount of about 60 to 99% by weight of the low-melting-point polyethylene terephthalate fiber based on the total weight of the fiber web; forming each of a first felt layer and a second felt layer by binding and hot-pressing the fiber web; forming each of a first nonwoven fabric layer and a second nonwoven fabric layer by alternately laminating the first felt layer and the second felt layer in two to three layers; and producing a needle-punched nonwoven fabric by laminating the second nonwoven fabric layer on the first nonwoven fabric layer, followed by needle punching, wherein the first polyethylene terephthalate fiber has a tensile strength of about 3 to 3.7 g/De, the low-melting-point polyethylene terephthalate fiber has a tensile strength of about 3 to 3.7 g/De, and the number of times of the needle punching in production of the needle-punched nonwoven fabric is about 20 to 80 punching/cm$^2$.

2. The method according to claim 1, wherein the first polyethylene terephthalate fiber has a fiber length of about 48 to 76 mm.

3. The method according to claim 1, wherein the low-melting-point polyethylene terephthalate fiber has a fiber length of about 48 to 76 mm.

4. The method according to claim 1, wherein, in the forming the each of the first nonwoven fabric layer and the second nonwoven fabric layer, each of the first nonwoven fabric layer and the second nonwoven fabric layer is formed by repeatedly laminating the fiber web in a multilayer structure of three to five layers thereof.

5. The method according to claim 1, wherein, in the producing the needle-punched nonwoven fabric, the needle-punched nonwoven fabric has a weight per unit area of about 600 to 1,500 g/m$^2$.

* * * * *